Nov. 4, 1958 — A. I. APPLETON — 2,858,861
FRUIT REAMER AND STRAINER
Original Filed Nov. 13, 1951

INVENTOR.
Arthur I. Appleton
BY Carlson, Pitzner, Hubbard & Wolfe
Attys.

Nov. 4, 1958 A. I. APPLETON 2,858,861
FRUIT REAMER AND STRAINER
Original Filed Nov. 13, 1951 5 Sheets-Sheet 2

INVENTOR.
Arthur I. Appleton
BY
Carlson, Pitzner, Hubbard & Wolfe
Attys.

Nov. 4, 1958 A. I. APPLETON 2,858,861
FRUIT REAMER AND STRAINER
Original Filed Nov. 13, 1951 5 Sheets-Sheet 3
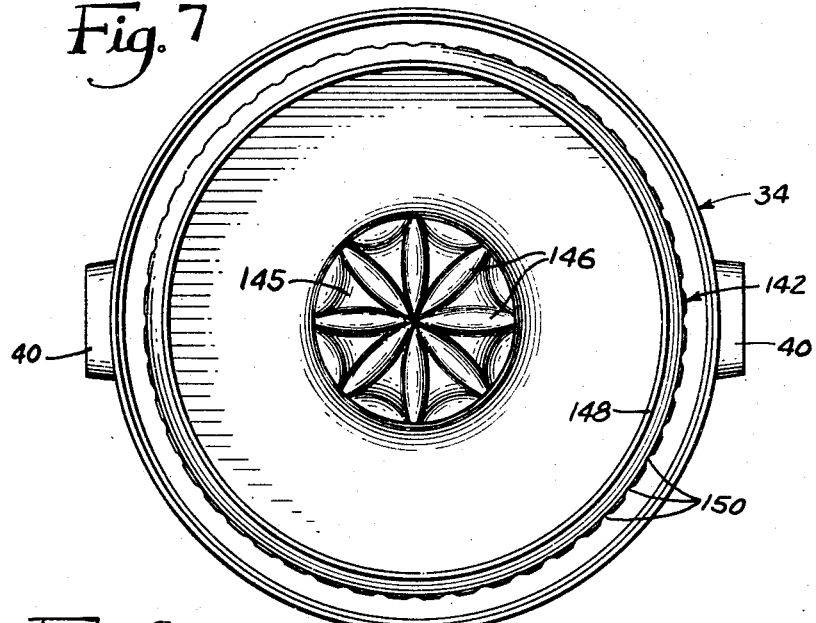
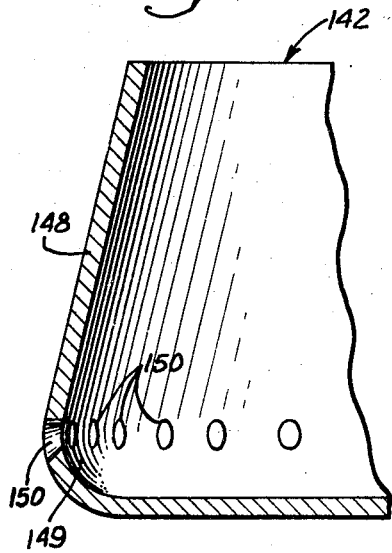
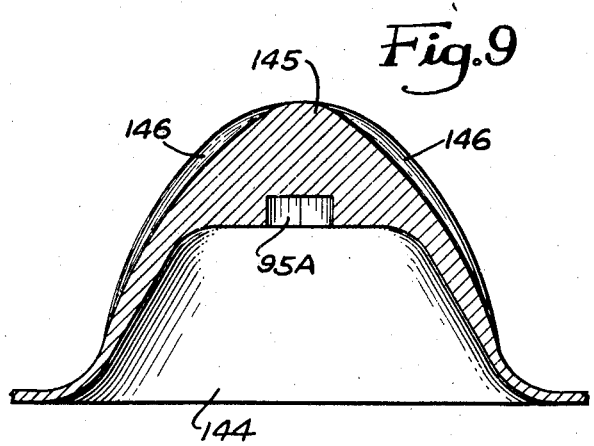
INVENTOR.
Arthur I. Appleton Nov. 4, 1958  A. I. APPLETON  2,858,861
FRUIT REAMER AND STRAINER
Original Filed Nov. 13, 1951  5 Sheets-Sheet 4
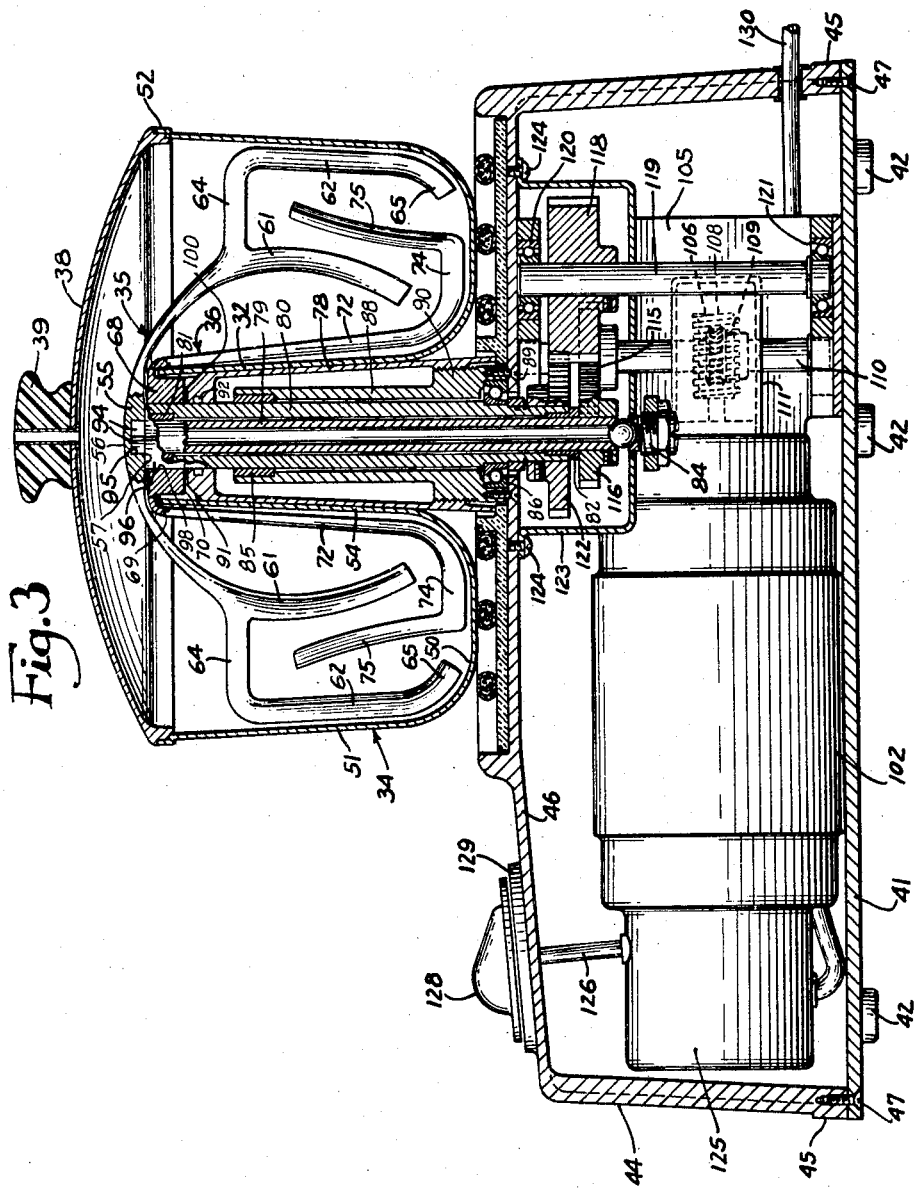
INVENTOR.
Arthur I. Appleton
BY
Carlson, Pitzner, Hubbard & Wolfe
Attys.

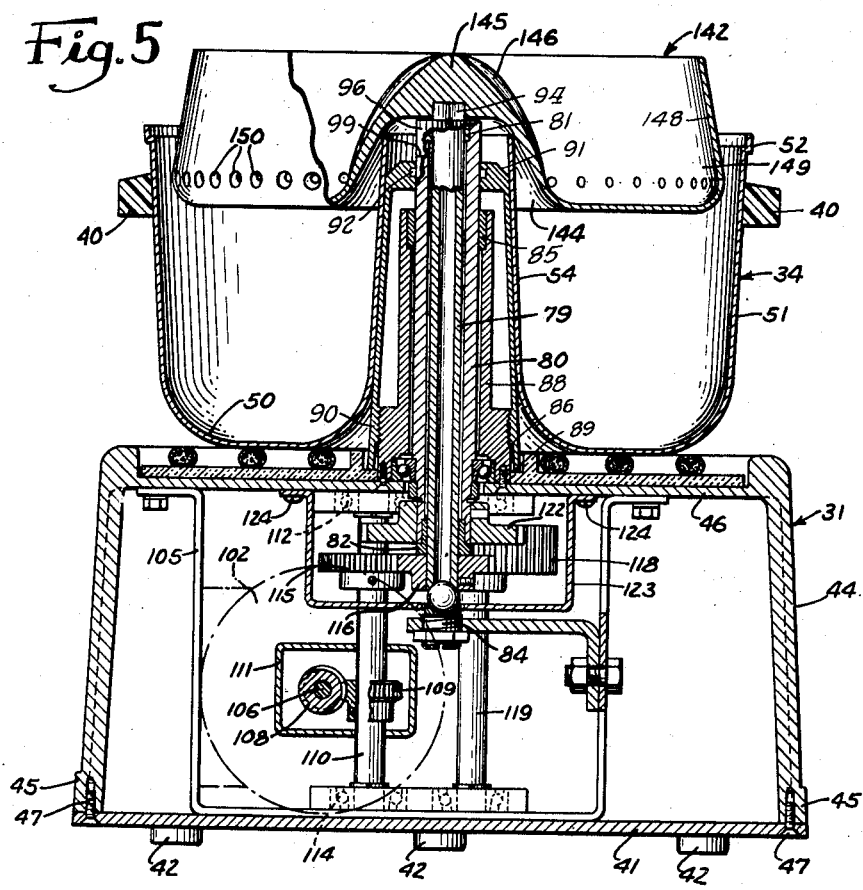
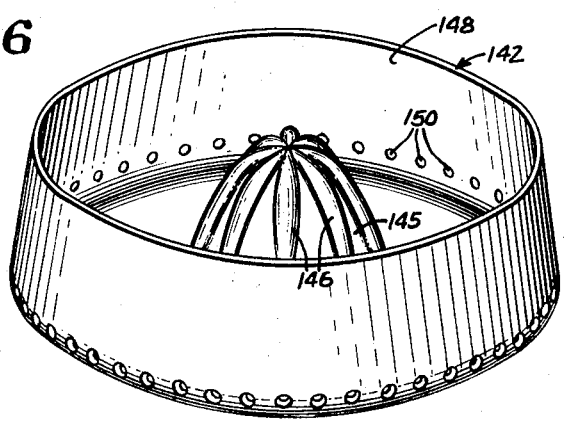

United States Patent Office 2,858,861
Patented Nov. 4, 1958

2,858,861

FRUIT REAMER AND STRAINER

Arthur I. Appleton, Northbrook, Ill.

Original application November 13, 1951, Serial No. 256,066. Divided and this application November 3, 1954, Serial No. 466,506

2 Claims. (Cl. 146—3)

The present invention pertains generally to mixing apparatus and, more specifically, to a novel juicer attachment for a power-operated mixer for mixing various fluid, solid and pulverous materials. It finds particular, but by no means exclusive, utility when embodied in a household appliance for mixing foods. The invention is, however, adapted to serve with equal facility in commercial or industrial applications for mixing other substances as well as foods.

One object of the present invention is to provide a power driven mixer and juicer particularly well adapted for household use, being susceptible of operation with far greater ease and convenience than mixers of the type heretofore known, and also being substantially spatter-proof when operating.

More specifically it is an object to provide a juicer attachment for a power mixer having an annular mixing bowl, wherein the juicer provides a fruit reamer and strainer carried inside the bowl and adapted to render and discharge juice with a minimum of splashing into the mixing bowl.

Still another object is to provide an appliance of the foregoing type having a particularly attractive appearance and which, when idle, will be completely closed so as to eliminate the necessity for a plastic dust cover.

A further object is to provide a mixer as set forth above and which will include a novel juicer attachment of simple, non-breakable construction.

Still another object is to provide a juicer attachment capable of being cleaned with ease, as by simple rinsing under a water faucet.

Other objects and advantages will become apparent as the following description proceeds, taken in connection with the accompanying drawings, in which:

Fig. 3 is an enlarged, fragmentary, vertical sectional view through the longitudinal medial plane 3—3 of the appliance shown in Fig. 1.

Fig. 5 is a transverse, vertical sectional view through the mixer with the juicer attachment in operative position, such view being taken in the plane of the broken line 5—5 in Fig. 4.

Fig. 6 is a perspective view of the juicer attachment per se.

Fig. 7 is a plan view of the juicer attachment and bowl shown in Fig. 5.

Figs. 8 and 9 are enlarged, fragmentary vertical sectional views showing details of the juicer attachment per se.

Figure 1:
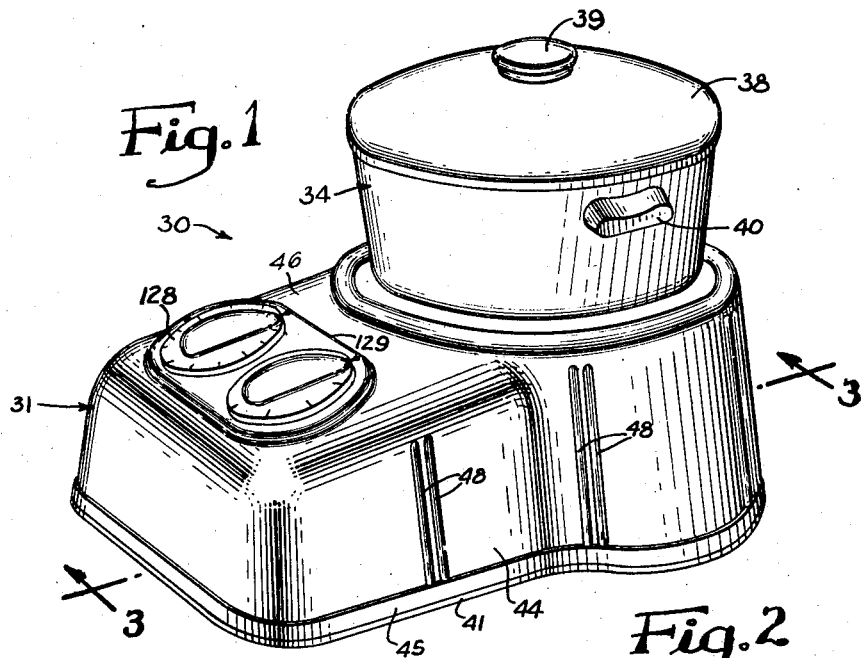
Figure 1 is a perspective view of an illustrative mixer and juicer embodying the present invention.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

Referring more specifically to the drawings, the invention is there exemplified in a novel juicer attachment (Figs. 5–9) for an appliance which, in this instance, happens to be a household food mixer 30. For convenience the appliance will first be described. In general, the mixer 30 comprises a base 31 having an upstanding power head 32, a mixing bowl 34 which telescopes over the power head, and a pair of counter-rotating impellers 35, 36 drivingly supported from the power head 32. For purposes of description, the impeller 35 will be referred to herein as the upper impeller while the impeller 36 will be called the lower impeller. (See Figs. 2 and 3). The bowl 34 is equipped with a cover 38, which may be of transparent material, having a center handle 39. One or more handles of suitable form, such as the pair of handles 40, may also be mounted on the bowl 34.

The base 31 of the illustrative mixer 30 is assembled upon a bed 41 having feet 42 of rubber or similar material to prevent sliding of the mixer on the counter, table top, or other horizontal surface which supports it. The bed 41 is surmounted by a hood or casing 44 with sloping side walls extending upwardly from a peripheral flange 45 and curving gracefully into a top wall 46. The casing 44 may, for example, be of stamped sheet metal, cast light metal, or molded plastic material, having a plurality of internal ribs or thickened portions receiving screws 47 which anchor it to the bed 41. The side walls of the casing 44 may also have external embossments or ribs 48 which serve as stiffeners and enhance its appearance.

The mixing bowl 34 (Figs. 1, 2, 3 and 5) in its preferred form, has a substantially annular shape and may be constructed from a wide variety of materials including aluminum, stainless steel and glass. In the present instance, the bowl 34 comprises a dished or concave bottom 50 merging into an outer wall 51 which has a slight outward and upward taper, terminating in a peripheral rim 52 adapted to register with the rim of the cover 38. The bowl bottom 50 also merges with a hollow central boss 54, flared out at its base and tapered toward its upper or free end which is situated at or near the top of the bowl 34. The internal contour of the boss 54 is complementary with the exterior contour of the power head 32. These parts are so proportioned that the bowl boss 54 can be centered on, and telescoped over, the power head 32 with the bottom of the bowl resting upon the top of the base casing 31 (see Figs. 3 and 5).

Turning next to the counter-rotating impellers 35, 36, it will be perceived that the same have been constructed and arranged to sweep the entire normally usable volume of the mixing bowl 34. By "normally usable volume" is meant the maximum volume at which a user would ordinarily fill the bowl while still permitting the same to be handled conveniently and without likelihood of spillage. By the same token, the impellers 35, 36 have been constructed and arranged to sweep exceptionally close to substantially the entire inside wall surface of the bowl 34 included within the normally usable volume of the same. This avoids the building up of accumulations of unmixed or poorly mixed substances on the bowl walls and insures a maximum yield of properly mixed materials from the bowl.

Figure 2:
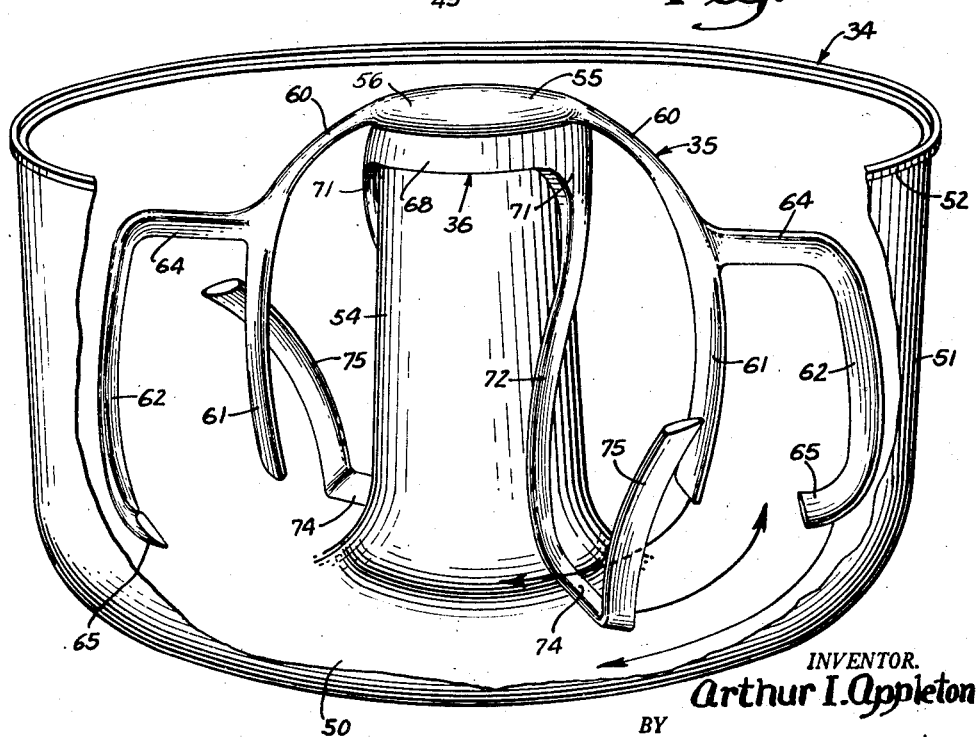
Fig. 2 is an enlarged, fragmentary perspective view of the mixing bowl and impellers of the appliance shown in Fig. 1.

In the present instance, as indicated in Fig. 2, the top impeller 35 is driven in a clockwise direction (as viewed from the top) while the bottom impeller 36 is driven in a counter-clockwise direction (also as viewed from the top). Since each impeller is formed with a pair of diametrically opposed portions, this means that each impeller sweeps past the other twice per relative revolution.

Starting with the top impeller 35, it will be noted that the same comprises a central hub 55 with a relatively flat but substantially convex top contour 56 and a flat bottom face 57. Fixed to, and preferably integral with the hub 55 are a pair of outwardly extending, diametrically opposed arms 60. In this instance, the arms 60 droop downwardly from the hub 55 but initially remain well clear of the bottom impeller 36 to avoid the possibility of pinching the fingers of an inadvertent user. Eventually, the arms 60 terminate in an inner blade 61 and an outer blade 62, connected as by means of a top or cross blade 64. The depending ends 65 of the blades 62 curve radially inward, generally following the curvature of the dished bowl bottom 50.

The bottom impeller 36, on the other hand, comprises a central hub 68 of substantially cylindrical form and having flat top and bottom faces 69, 70, respectively. Extending downwardly from the lower face 70 of the hub 68, and fixed integrally thereto, are a pair of diametrically opposed arms 71 each defining an inner blade 72, a bottom blade 74 and a reversely bent outer blade 75. The inner blades 72 are adapted to nest closely along the tapered central boss 54 of the mixing bowl and are adapted to pass between the boss 54 and the inner blades 61 of the top impeller 35 upon relative rotation of the impellers. By the same token, the outer blades 75 of the bottom impeller occupy an intermediate position in the bowl cross-section and pass between the inner and outer blades 61, 62 of the top impeller 35 upon relative rotation of the impellers. The bottom blades 74 at the same time pass between the depending ends of the inner blades 61 and the dished bottom surface of the mixing bowl.

The power head 32, which drivingly supports the impellers 35, 36 comprises an upstanding column 78 within which are journaled a pair of counter-rotating concentric impeller drive shafts 79, 80. The shaft 79, which happens to be the inside shaft, in this instance is of tubular construction and is journaled within the upper and lower guide bearings 81, 82 carried by hollow outside shaft 80. The downward thrust on the shaft 79 may readily be taken up as by means of a ball thrust bearing 84 located within the casing 44. The outside shaft 80, on the other hand, is journaled in an upper guide bearing 85 and a lower combined thrust and guide bearing 86. The bearings 85 and 86 are mounted within appropriate recesses in an upstanding bearing sleeve 88 fixed to the top wall 46 of the base casing as by means of screws 89.

The upstanding power head column 78 is of upwardly tapering circular form and is secured in place as by means of threads 90 which engage mating threads on the bearing sleeve 88. The taper of the column 78 is preferably complemental to that of the inside of the bowl boss 54 so that the column 78 is adapted to serve as a centering means for the bowl 34. The upper end of the column 78 may have a frusto-conical chamfer 91 to facilitate entry into the tapered bore of the bowl boss 54. The upper end of the column 78 may also be thickened somewhat and formed with a recess 92 housing an O type sealing ring (not shown) to prevent leakage of spilled materials along the outside of the outer shaft 80. Referring to Figs. 3 and 5, it will be perceived that a detachable driving connection is provided between the inside shaft 79 and the top impeller 35, on the one hand, and between the outside shaft 80 and the bottom impeller 36, on the other hand, thus enabling the impellers to be instantaneously detached from their drive shafts as an incident to lifting the bowl 34 off the base 31 and the power head column 78. Such connections also adapt the impellers 35, 36 to be connected to their drive shafts with utmost ease and speed. Accordingly, it will be noted upon reference to Figs. 3 and 5 that the projecting upper end of the inside shaft 79 terminates in a section of non-circular cross-section and in this instance has a plurality of flats 94 thereon defining a substantially square cross-section. This portion of the shaft 79 is adapted to slidably fit into a complemental recess 95 in the hub 55 of the top impeller 35 (Fig. 3). The inside end of the recess 95 is substantially parallel with the underface 57 of the hub 55 and seats neatly upon the flat end face of the shaft 79, thus squarely supporting the top impeller 35 and restraining the same against accidental tilting.

Similarly, the upper end portion of the outside shaft 80 is adapted to project above the top of the column 78, such portion of the shaft also being non-circular and having flats 96 defining a square cross-section therein (Figs. 3 and 5). This squared end of the outside shaft 80 is adapted to slidably fit into a polygonal recess 98 in hub 68 of the bottom impeller 36. The hub 68 slides down along the flats 96 and eventually seats against shoulders 99 at their lower ends (Fig. 5). To accommodate the upstanding top edge of the bowl boss 54 when the bottom impeller 36 is thus seated, the hub 68 of the impeller 36 is relieved as by means of an annular clearance groove 100 extending upwardly from its bottom face 70.

Figure 4:
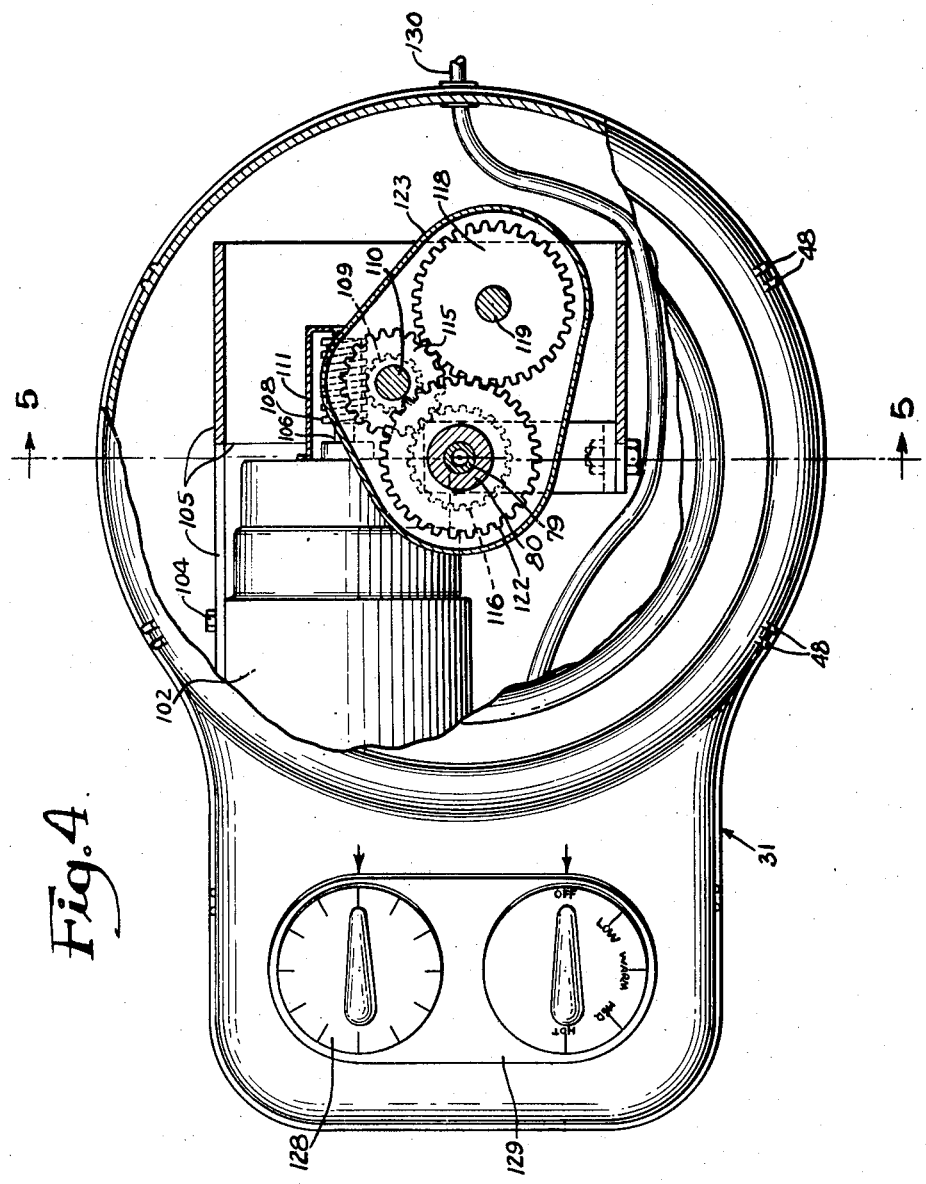
Fig. 4 is a fragmentary plan view of the base of the appliance as shown in Fig. 3, certain portions of the casing being broken away to illustrate internal details.

Counter-rotation of the shafts 79, 80 is effected by means of a driving motor 102 housed within the base casing 44 (Fig. 3). In the present instance, the motor 102 is fastened, as by bolts 104 (Fig. 4), to a mounting bracket 105 which, in turn, is fixed to the casing 44. The motor shaft 106 has a worm 108 fixed thereon and meshing with a worm wheel 109 drivingly fixed to an intermediate shaft 110. The worm and worm wheel comprise a primary speed reduction means and may be encased in a protective box 111. The intermediate shaft 110 is journaled in a pair of vertically alined bearings 112, 114 fixed respectively to the top wall 46 of the base casing and to the intermediate portion of the bracket 105 adjacent the bed 41. Pinned or otherwise rigidly fixed adjacent the upper end of the intermediate shaft 110 is an intermediate drive gear 115 which meshes with a pinion 116 fixed to the lower end of the top impeller drive shaft 79. The intermediate drive gear 115 also meshes with an idler gear 118 of substantially greater axial length and which is fixed to an idler shaft 119 journaled in bearings 120, 121. The idler 118, in turn, meshes with a drive gear 122 fixed to the lower end of the bottom impeller drive shaft 80. The gears 116, 122 rotate in opposite directions and may be separated by the shoulder of the lower guide bearing 82. The gear train just described may be housed within a gear box 123 secured as by means of screws 124 to the top wall 46 of the casing 44. If desired, the box or housing for the gear train may be included as a part of the motor casing.

For the purpose of driving the impellers 35, 36 at selectively variable speeds corresponding to the requirements for the substances being mixed in the bowl 34, the motor 102 may be equipped with an adjustable governor 125. While the present invention is not particularly concerned with the details of the governor 125, it might be noted that, in this instance, the governor is constructed as a component part of the motor assembly and is provided with an upstanding adjusting stem 126 terminating at its upper end in a speed control dial, which is actually a calibrated manual adjusting dial 128. To preclude spilled material from entering the casing 44 via the opening through which the adjusting stem 126 extends, the top wall 46 of the casing has an embossment or raised island 129 formed therein and disposed in underlying relation with the speed control dial 128. Power for the motor 102 may be supplied via the governor unit as by means of a power supply cord 130 which enters the back wall of the casing 44.

Now turning to the present invention, in order to enhance still further the utility of the mixer which has been described hereinbefore, a juicer attachment for rendering juice from citrus fruits and the like is provided to be carried by the upstanding power head in place of the beaters. In keeping with the invention, the juicer attachment when operated discharges juice into the annular mixing bowl. The juicer attachment comprises a rotary drum 142, preferably of metal, and adapted to nest within the upper portion of the bowl 34 which serves as the collection receptacle for the juice. The drum 142 has a large clearance recess 144 in its underside which nests over the upper ends of the bowl boss 54 and the power head column 79. Communicating with such recess is a smaller recess 95A comparable in size and shape to the recess 95 in the top impeller 35. Thus, upon removal of the impellers 35, 36 from the power head, the drum 142 is adapted to be drivingly seated on the projecting upper end of the inside drive shaft 79 (Fig. 5) with the bowl 34 disposed in surrounding and underlying relation with the drum 142. The connection between the drive shaft 79 and the drum 142 is a detachable one, making it possible to remove the drum 142 bodily from the shaft 79 and the power head as an incident to lifting the bowl 34 from the power head.

Centrally disposed within the juicer drum 142 and on the opposite side of the recess 144 is a fruit reamer 145. This comprises a generally parabolic hub with raised ribs 146 converging upwardly toward its apex. As the drawings imply, rotation of the inner shaft 79 serves to rotate the fruit reamer 145 bodily with the juicer drum 142, since the members 142, 145 are integrally connected. The rotating reamer 145 is of course adapted to crush the pulp of a piece of fruit, such as half an orange, held in the hand of the user and pressed down against the reamer, yielding juice.

For the purpose of straining the juice and discharging it from the drum 142 without spattering or splashing outside the bowl 34, the juicer drum is formed with an imperforate bottom and a substantially imperforate side wall 148 tapering upwardly from a convex region of maximum diameter to a top edge portion of substantially lesser diameter. This defines within the drum 142 an annular pocket 149 which traps the juice running off the fruit reamer. The juice accumulating within the pocket 149 is readily strained off by the action of centrifugal force, leaving pits and coarse pulp behind, such being accomplished by means of a plurality of generally radial holes 150 (Figs. 5, 7 and 8) which perforate the annular pocket 149. Since the outwardly bulging portion of the rotary drum 142, which defines the perforated annular pocket 149, is nested within the bowl 34, the latter serves as a collecting receptacle for the juice discharged from the pocket 149.

Each of the holes 150 may increase in diameter from the inside to the outside of the drum 142, such outward taper preferably being about a downwardly inclined axis to further minimize splashing. The outward taper on the holes 150 greatly facilitates cleaning of the juicer drum, it being necessary only to rinse the drum under a faucet to dislodge accumulated pulp and pits from the pocket 149. The size of the holes in the strainer at the inside is relatively small for straining out fruit pits and pulp from the juice.

I claim:

1. In a juicer of the character set forth and having a bowl centered about a power head and disposed so that the outer wall thereof is in surrounding relation with said power head and about the same level, the combination comprising an annular, open top, rotary drum detachably mounted on and driven and supported by said power head; and a fruit reamer in the center of said drum; said drum including an imperforate bottom wall extending outwardly from the center of said drum to a region of maximum diameter disposed at a level below the peripheral rim of said bowl and a substantially imperforate side wall tapering upwardly from said region of maximum diameter and terminating in an upper edge portion of substantially lesser diameter and at a level above the peripheral rim of said bowl, said region of maximum diameter where the imperforate bottom wall merges into the lower portion of the substantially imperforate side wall constituting an annular pocket defined by portions of said bottom and side walls and having a plurality of generally radial holes extending from the inside to the outside thereof, said side wall being imperforate except for said holes, said pocket being provided for receiving and centrifugally straining juice running off said reamer, centrifugal force when said drum is rotated and the taper of said side wall thereof causing juice to flow from said reamer into said annular pocket and outwardly through the holes thereof, said bowl surrounding said drum and receiving and collecting therein juice discharged through said holes at said level below the peripheral rim of said bowl, each of said holes increasing in diameter from the inside to the outside of the drum to form a tapered hole to minimize splashing and to facilitate cleaning of said holes, the size of the holes at the inside of the drum being relatively small for straining fruit pits and pulp out of the juice as the juice passes through said holes.

2. In a juicer as defined in claim 1 wherein each tapered hole is formed on a downwardly inclined axis to further minimize splashing of the juice.

References Cited in the file of this patent

UNITED STATES PATENTS

| 2,057,564 | Edgerton | Oct. 13, 1936 |
| 2,552,572 | Mikina | May 15, 1951 |

FOREIGN PATENTS

| 427,647 | Great Britain | Apr. 29, 1935 |